E. BUSS.
Tachometer or Speed Indicator.
No. 201,495. Patented March 19, 1878.
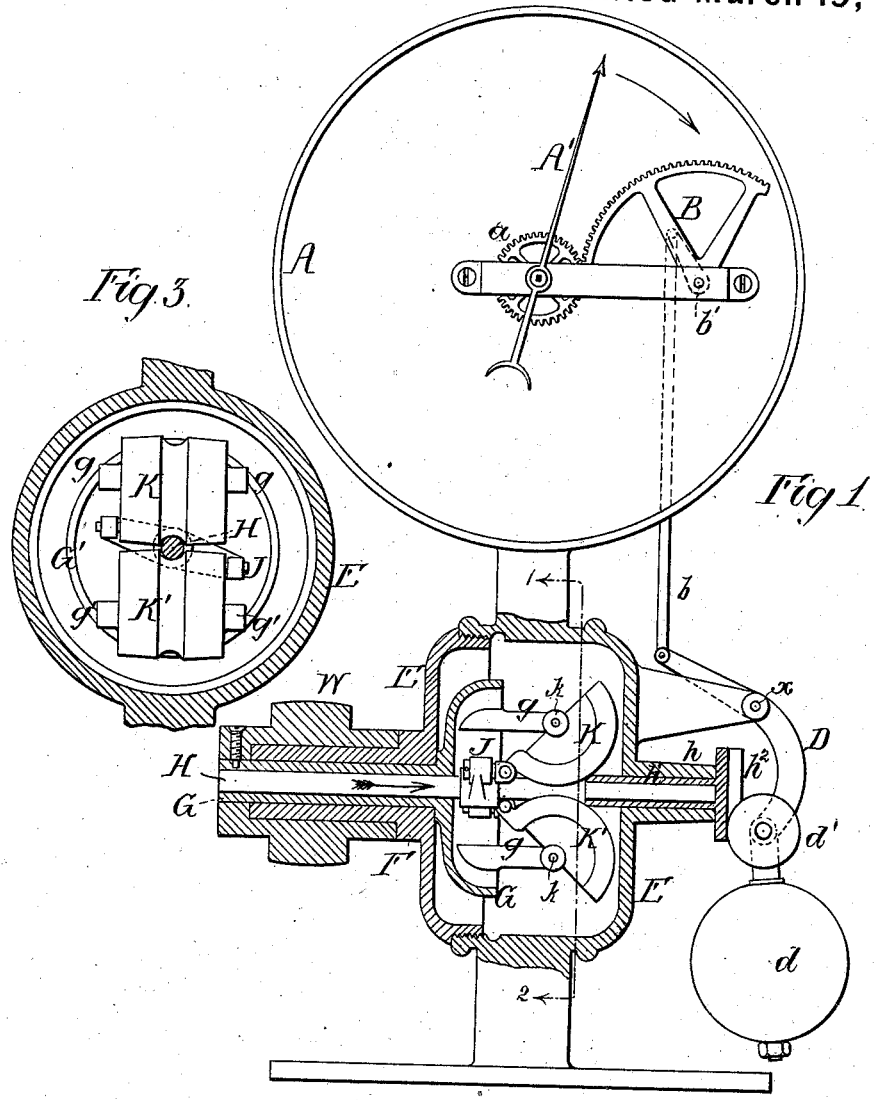
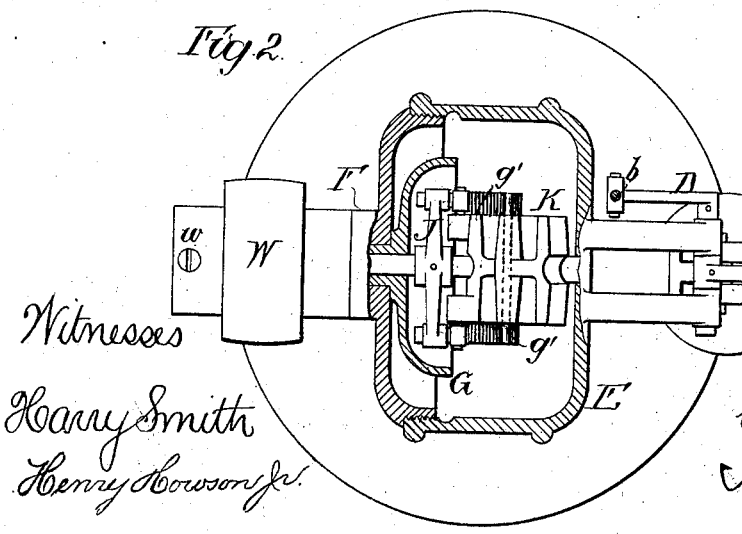
Witnesses
Harry Smith
Henry Howson Jr.
Inventor
Edward Buss
by his Attorneys
Howson & Son

UNITED STATES PATENT OFFICE.

EDWARD BUSS, OF MAGDEBURG, PRUSSIA.

IMPROVEMENT IN TACHOMETERS OR SPEED-INDICATORS.

Specification forming part of Letters Patent No. 201,495, dated March 19, 1878; application filed December 8, 1877.

*To all whom it may concern:*

Be it known that I, EDWARD BUSS, of Magdeburg, Prussia, have invented a new and useful Improvement in Tachometers, (an instrument for measuring velocities of rotative shafts,) of which the following is a specification:

The object of my invention is to construct an instrument for accurately indicating the speed of machinery in motion; and this object I attain in the manner which I will now proceed to describe, reference being had to the accompanying drawing, in which—

Figure 1 is a vertical section of my improved indicator; Fig. 2, a sectional plan; and Fig. 3, a sectional view on the line 1 2, Fig. 1.

On the upper part of the frame of the machine is arranged the dial-casing A, carrying the dial-plate, which has the properly-graduated divisions, the said dial-plate not being shown in the drawings. A' is the pointer, the pivot-pin of which is adapted to bearings in the casing A, and carries a cog-wheel, $a$, gearing into a toothed segment, B, whose pivot-pin $b'$ extends to the outside of the casing, and has an arm connected by a rod, $b$, to a lever, D, pivoted at $x$ to projecting arms on the frame of the indicator, and carrying a weight, $d$, at its lower extremity.

To a sleeve, F, projecting from and forming part of the casing E, is adapted the tubular shaft G, terminating in a bell-shaped flange, G', within the casing E, the opposite end of the shaft being secured to a pulley, W, which is arranged to revolve on the sleeve F, and is to be driven by a belt from a pulley on some moving part of the machine, the speed of which has to be determined by the instrument.

One portion of a sliding rod, H, is adapted to the interior of the tubular shaft G, the other portion fitting freely in a sleeve, $h^1$, which can slide to and fro in a projection, $h$, of the casing, and against the head $h^2$ of this sleeve bear two anti-friction rollers, $d'$, carried by the weighted lever D, one roller being on each side of a vertical rib on the said head of the sleeve, so that the latter cannot turn, although it is at liberty to be moved in one direction by the action of the rod G, and in the other by that of the weighted lever.

K and K' are two segments, one hinged to two arms, $g\ g$, projecting from the flange G' of the sleeve G, and the other to two arms, $g'\ g'$, on the same flange, the peripheries of the two segments being grooved for the passage between them of the rod H, to which is secured a cross-piece, J, one end of the latter being hinged to a corner of the segment K, and the other to the corner of the segment K'.

The operation of the instrument is as follows: As the pulley W and the tubular shaft G and its flange G' are caused to rapidly revolve, carrying with them the segments, cross-bar J, and rod H, there will be a tendency of the said segments, owing to centrifugal force, to turn on their pivots in the direction of the arrows, and this movement will be transmitted to the pointer through the rod H, weighted arm D, segment B, and wheel $a$, and the extent to which the pointer will be moved will depend upon the speed of the tubular shaft G, an increase of speed tending to move the rod H in the direction of the arrow, and a diminution of the speed inducing the weight to move the rod in a contrary direction. In other words, the pointer is under the control of two influences—one the weighted arm, and the other the centrifugal force of the segments—and the speed of the shaft G determines which influence shall predominate, and hence the pointer, with a properly-graduated dial-plate, must serve to indicate the speed of the shaft G.

It is not essential, in carrying out my invention, that weights of segmental form or connections precisely as shown should be used, although I prefer the arrangement described as being compact and effective.

I prefer to so attach a light coiled spring to the pivot of the pointer A' that it will counteract any tendency of the looseness of the teeth to produce an irregular movement of the pointer.

I am aware that it is not new to combine a sliding rod acted on by centrifugal weights with devices for indicating. This, therefore, I do not desire to claim, broadly; but

I claim as my invention—

1. In a speed-indicator, the combination of indicating mechanism with a sliding spindle or rod, controlled in one direction by centrifugal force derived from revolving weights, and in the contrary direction by a lever pivoted to the frame, and carrying a weight at one end, and connected at the other end to the said indicating mechanism, substantially as set forth.

2. The combination of the tubular shaft G and weights pivoted to the same with a sliding rod, H, having a cross-bar connected to the said weights, all substantially as set forth.

3. The combination of the sliding rod H, the sleeve $h$, and its head, having a rib, $h^1$, with the weighted lever and its anti-friction rollers.

In testimony whereof I have signed my name to this specification in the presence of two subscribing witnesses.

EDWARD BUSS.

Witnesses:
 CARL MAX LOMBART,
 BERTHOLD ROI.